Reissued Sept. 16, 1930

Re. 17,805

UNITED STATES PATENT OFFICE

HELENA S. SADTLER, OF ERDENHEIM, PENNSYLVANIA

STEEL PRINTING BODY AND METHOD OF PRODUCING THE SAME

No Drawing. Original No. 1,678,231, dated July 24, 1928, Serial No. 718,237, filed June 6, 1924. Application for reissue filed February 11, 1930. Serial No. 427,643.

Because of its durability it is very desirable that hard steel be employed in the manufacture of printing cylinders or other printing bodies having curved printing surfaces, or printing plates, but owing to the difficulty of engraving or otherwise forming thereon the design or symbol to be reproduced by printing, printing bodies of such material have not heretofore been satisfactory. Attempts have been made heretofore to engrave the metal while in a relatively soft condition and thereafter subject the same to a hardening process but such method has proved unsatisfactory because of the warping or changing in shape of the body having the characters or designs thereon.

The general object of my invention is to provide hard bodies, such as hardened steel, particularly cylindrical bodies or bodies having curved surfaces, with characters or designs from which printing impressions may be taken, the said characters or designs to be formed thereon after the hardening process has been completed.

It is also an object of the invention to provide an improved printing body in which the outer or printing surface shall consist of hard steel.

Without attempting at this point to set forth all of the various objects and advantages of my invention I shall proceed with a detailed description thereof wherein will be pointed out additional objects and advantages, or elese such additional objects and advantages will be apparent therefrom.

In describing my invention I shall refer first to the method employed in the manufacture of printing cylinders and thereafter will refer briefly to the application of the same to the manufacture of printing bodies of steel having hard printing surfaces which are flat or of some other shape than cylindrical.

In the carrying out of my new method in the manufacture of cylindrical printing bodies, whether the cylinders be solid or of tubular formation, I may take as a suitable steel either that known as Shelby steel or nickel steel, but any other high grade or quality of steel may be employed. The steel cylinder is subjected to a hardening process either with or without the addition of carbon, as may be required. The hardening may extend only a short distance inwardly from the outer surface or it may extend throughout the mass of the metal of the cylinder, whether the same be of solid or tubular formation. The cylinder after having been hardened is ground and polished so as to provide the same with a true cylindrical surface.

In case it is desired to employ the cylinder for intaglio printing, such for instance as the printing of transfer designs, it may be desirable to provide the cylinder with a thin hard shell so that in etching the characters or designs thereupon, whether such etching be done by an acid or an electrolytic process, the etching will extend through the hard shell of metal into the softer metal underneath, which latter may be smoothed and cut by the ordinary hand tools employed by engravers for the purpose of "touching up" and sharpening the design. It will be understood that the portion of the surface not intended to be acted upon in the etching process must be covered by a suitable acid-resisting material.

It will be seen that by my process I first provide a steel cylinder having a hard surface which may afterwards be etched so as to form thereon the character or design, multiple impressions of which are desired.

The hardening of the steel, whether in the form of cylinders or in other forms, especially when a small amount of carbon is employed to carbonize the same, renders it quite homogeneous and of fine texture, thereby making it possible to obtain extremely accurate etching either by the acid or the electrolytic process. The amount of carbon to be employed as the steel body is subjected to heat in the hardening process will be varied as may be necessary in order to obtain the character of hardened shell which may be desired. The amount of carbon to be employed and the method of carrying out the hardening process will be familiar to metallurgists and steel workers, hence it is deemed unnecessary to enter into the details of the hardening process.

It will be apparent that the method employed by me in the manufacture of steel printing cylinders having hard printing surfaces may be employed in the manufacture of printing members having steel bodies provided with surfaces of other shapes or configurations. The method employed is the same whether it be in connection with a cylinder or a body of other shape or form.

One of the practical advantages incident to the employment of steel bodies having hard exterior printing surfaces is that they are extremely durable as compared with those consisting of copper or cast iron now generally employed, and of course much more durable than the electrotype forms which now are quite generally manufactured in curvilinear form and secured to the outer surfaces of cylinders to form cylindrical printing surfaces.

It will be seen that by my invention I am enabled to produce steel printing bodies having cylindrical or other forms of printing surfaces in which the hardened surfaces are ground and polished smooth and even before the characters or designs are formed therein and that in this way printing bodies having the advantages and desirable qualities heretofore indicated are readily produced.

Having thus described my invention, what I claim and desire to secure by Letters Patent is:

1. The method of producing steel printing bodies, which consists in first subjecting the same to a hardening process including the addition of carbon to carbonize the same, grinding and polishing the hardened body to provide the same with a true and even surface, and thereafter etching said surface to form characters or designs thereon.

2. The method of producing steel printing bodies, which comprises the hardening of the outer portion thereof to form a relatively thin hard shell which covers an inner relatively soft body portion, grinding and polishing the portion of said body on which it is intended to form the characters or designs from which impressions are to be taken to produce a smooth and even surface, and thereafter subjecting the said portion of the body to an etching process to produce grooves therein in the form of characters or designs, the said etching process being continued until the lines cut into the softer mass inside of the said outer hardened shell.

3. The process of producing a printing body which includes heat-treating the surface of a steel body to harden it, grinding and polishing the surface to render it smooth and true and thereafter etching the steel surface in the form of the desired design.

4. The process of producing a printing body which includes etching the surface of a body having a thin, hard outer shell, continuing the etching until the etching extends through the hard shell, and thereafter touching up a portion of the etched design by hand tooling.

5. The process of producing a printing body which includes etching the surface of a body having a thin, hard outer shell, continuing the tching until the etching extends through the hard shell and thereafter further deepening portions of the etched design.

6. The process of producing a printing body which includes heat-treating the surface of a steel body to harden the surface and to form a relatively thin shell which covers a relatively soft body portion and thereafter etching the hardened steel surface to cut through the said hardened shell into the relatively soft mass underneath to form the desired design therein.

In testimony whereof, I have signed my name to this specification.

HELENA S. SADTLER.